(12) United States Patent
Collins et al.

(10) Patent No.: US 7,977,922 B1
(45) Date of Patent: Jul. 12, 2011

(54) BATTERY CHARGER FOR AIRCRAFT EMERGENCY EGRESS BATTERIES

(76) Inventors: Ralph C. Collins, Phoenix, AZ (US); Greg N. Pierce, Gilbert, AZ (US)

(*) Notice: Subject to any disclaimer, the term of this patent is extended or adjusted under 35 U.S.C. 154(b) by 0 days.

(21) Appl. No.: 12/660,950

(22) Filed: Mar. 8, 2010

Related U.S. Application Data

(63) Continuation-in-part of application No. 11/456,087, filed on Jul. 7, 2006, now Pat. No. 7,679,335.

(51) Int. Cl.
*H02J 7/04* (2006.01)
*H02J 7/16* (2006.01)

(52) U.S. Cl. ............... 320/141; 320/128; 320/140

(58) Field of Classification Search .............. 320/141
See application file for complete search history.

(56) References Cited

U.S. PATENT DOCUMENTS

| | | | | |
|---|---|---|---|---|
| 4,464,559 A | * | 8/1984 | Greene | 219/130.51 |
| 5,200,690 A | * | 4/1993 | Uchida | 320/106 |
| 5,648,714 A | * | 7/1997 | Eryou et al. | 320/139 |
| 2001/0000423 A1 | * | 4/2001 | Fischer et al. | 320/114 |
| 2003/0006735 A1 | * | 1/2003 | Kawakami et al. | 320/133 |
| 2003/0111980 A1 | * | 6/2003 | Lee | 320/143 |
| 2003/0113129 A1 | * | 6/2003 | Ahn | 399/66 |
| 2006/0192531 A1 | * | 8/2006 | Nishida | 320/128 |
| 2007/0139011 A1 | * | 6/2007 | Lin | 320/128 |

* cited by examiner

*Primary Examiner* — Edward Tso
*Assistant Examiner* — Arun Williams
(74) *Attorney, Agent, or Firm* — H. Gordon Shields

(57) ABSTRACT

A battery charger includes one or more channels for independently charging one or more batteries at different current levels. The battery charger also includes multiple modes for each channel for charging a battery with a continuous current or a pulse current. The battery charger supplies charging current by holding the charging voltage at a set value.

14 Claims, 6 Drawing Sheets

BATTERY CHARGER FOR AIRCRAFT EMERGENCY EGRESS BATTERIES

CROSS REFERENCE TO RELATED APPLICATIONS

This application is a continuation in part of application Ser. No. 11/456,087, filed Jul. 7, 2006 now U.S. Pat. No. 7,679,335.

STATEMENT REGARDING FEDERALLY SPONSORED RESEARCH OR DEVELOPMENT

Not Applicable

BACKGROUND OF THE INVENTION

1. Field of the Invention

This disclosure relates to battery charging systems, and, more particularly, to rechargeable battery charging systems.

2. Description of the Prior Art

Rechargeable batteries have been widely used in many different applications, and many different types of rechargeable batteries have been developed including, but not limited to, nickel-cadmium, nickle-metal-hydride, lithium, and lead acid. As batteries are charged some batteries are damaged if they are over charged. For instance, in some types of batteries crystals may form which interfere with the battery's ability to store a charge, and the battery's ability to supply voltage or current.

Another common problem when charging batteries is overheating the batteries. When a battery overheats during charging or as a result from overcharging, the structures inside the battery may become deformed, and the battery will have a reduced life, a reduced ability to store a charge, and reduced ability to supply voltage or current.

As batteries may be damaged if not charged properly, battery chargers are typically designed to charge one type of battery even if the charger has the ability to charge multiple batteries, all batteries must be the same type. If multiple types of batteries need to be charged, multiple battery chargers must be purchased.

Some battery chargers are pre-set to deliver a constant current to a battery for a specific period of time. Some chargers include a sensor to shut off the battery charging process when the battery has reached a specific voltage. Other chargers measure voltage of the battery and charge the battery at one voltage until a certain voltage is reached and then charge the battery at a different voltage for a period of time.

Each battery manufacturer recommends conditions for charging their battery, as the characteristics of one battery manufacturer to another are different, even for the same type (i.e. nickel-cadmium) of battery. Some manufacturers recommend a low voltage or low current charge after the complete charging of the battery to maintain the battery at full capacity before the battery is put into use.

Other methods of maintaining a battery include a pulse method where current is not continuous, but periodic to maintain the battery. Separate systems from the charging system are often used to maintain the battery at full capacity.

In applications where batteries are used in a regulated industry, or where reliability is very important, testing of batteries also must be done to ensure that the battery can perform as needed. Testing equipment is used in regulated industries, such as the airline industry, to verify and certify the ability of a battery. The testing equipment is typically separate from the charging equipment and the maintenance equipment.

Testing equipment may also be specific to a certain manufacturer because the characteristics of batteries from one manufacturer may be different than those from a different manufacturer. If batteries from multiple manufactures need to be tested, multiple sets of test equipment may be needed. As batteries in some industries need to be charged, tested, and maintained, and batteries are from multiple manufacturers, a large amount of equipment is typically needed to fill these needs.

Typically battery chargers are set to deliver a specific amperage value (current) to the battery over a specific period of time. The battery has some resistance and according to Ohm's law, the current (I) is equal to the voltage (E) divided by the resistance (R), or I=E/R. If the current is fixed and the resistance of the battery does not change during the charging cycle then the voltage will not change during the charging cycle. However, the resistance of the battery does change during the charging cycle, and may increase depending on the temperature of the battery and the amount of charge in the battery.

As the temperature of the battery increases, the resistance increases. According to Ohm's law, for the current to stay the same when the resistance increases the voltage must also increase. The increased voltage across battery when charging may increase the temperature of the battery, and the resistance of the battery. As the temperature of the battery increases, the battery may be damaged from overheating. The battery may also become overcharged.

When batteries are overcharged they are damaged. For example, nickel-cadmium batteries react to heat by forming crystals inside the battery. When a battery is charged the electricity effects a chemical reaction inside the battery, thereby "storing" electricity. When a battery is overcharged much of the electricity flowing into the battery is dissipated as heat instead of effecting a chemical change in the battery. Whether from overcharging or from charging too quickly, when a battery heats up crystals form which interfere with the chemical process. As these crystals become larger and more numerous from repeated overcharging and overheating, the battery is not able to efficiently deliver current as needed and is no longer useful.

The general intent with a battery charger is to recharge a battery to full capacity so that the battery can be used as many times as possible. Systems to maintain batteries are used as it is desirable to have a battery at full capacity when needed. Batteries will perform better if the charging and maintenance is based on the specific characteristics of the battery. As there are many different types of batteries, individual batteries will have their own specific charge time based of the battery condition, and the batteries of the same type may vary depending on the manufacturer. Further, batteries of the same type manufactured by the same manufacturer at the same time may vary in characteristics.

Therefore, it is desirable to have a battery charger that may be adjusted to meet the needs of charging for a specific battery as well as the specific needs to maintain the battery. It is also desirable to have a battery charger with multiple channels which can each be adjusted to meet the needs of a specific battery. There is also a need for a battery charger which reduces the chance of overheating or overcharging the battery.

SUMMARY OF THE INVENTION

The embodiments of the battery charger disclosed relate to a battery charging system for use in charging batteries having varying characteristics. The battery charging system may include a mode for continuous current supplied to the battery, and a mode for pulse current supplied to the battery. The term "continuous current" as used in this disclosure is different from "constant current." Continuous current describes a state where current is continuous, but may change value; this is distinguished from a pulsed or periodic current. Constant current describes a state where current is at a constant value and does not change.

The continuous current of the present invention is provided by a substantially constant voltage. As the voltage remains substantially constant, the amperage will vary in accordance with the resistance of the battery. As the battery charges, its resistance increases and therefore the current decreases in accordance with Ohm's law, all as discussed above. The battery being charged is thus part of the charging circuit in the present apparatus.

The embodiments of the battery charger disclosed may also include the ability for a continuous current may be adjusted based on the needs of a specific battery. The pulse voltage control may also have adjustments including, but not limited to, amplitude, duty cycle, frequency, adjustment of the leading edge of the pulse, and adjustment of the trailing edge of the pulse.

The embodiments of the battery charger may include a current meter to display the continuous or pulsed current, a volt meter to display the voltage status of the battery or the reference voltage flowing from the battery charging source to the battery circuitry from the battery charger, and indicators to show the status of the battery, and the status of current flowing to the battery.

The embodiments of the battery charger may include a timer with multiple functions for beginning and ending the charging of a battery.

The embodiments of the battery charger may also include multiple channels for charging batteries, where each channel may be adjusted independently from the other channels to meet the needs of a specific battery. The independent channels may use common meters such as a volt meter, and still be independently controlled and adjusted.

The embodiments of the battery charger may also include detection circuits to detect the battery voltage or the change in battery voltage, the temperature of the battery or the change in the battery temperature, and time that a battery has charged or the time since a certain condition was reached.

The embodiments of the battery charger may also include a circuit to provide a load for testing the battery under a load. The detection circuits and the load circuit may provide feedback to make changes in the adjustments and modes of the battery charger. The detection circuits and the load circuit may communicate with an external device. The external device may collect data, and may also provide feedback control.

The embodiments of the present battery charger apparatus may also include a potentiometer or variable resistor to set the desired voltage for continuous and pulsed voltage amplifiers, thereby setting the initial charging current.

As will be made clear, the disclosed embodiments of the battery charger provide important advantages in the charging, maintaining and testing of batteries, and are particularly adapted to batteries for aircraft egress lighting systems. At the present time, NiCd rechargeable batteries are the prevalent type of batteries used in aircraft egress lighting systems.

DETAILED DESCRIPTION OF THE INVENTION

Figure 1:
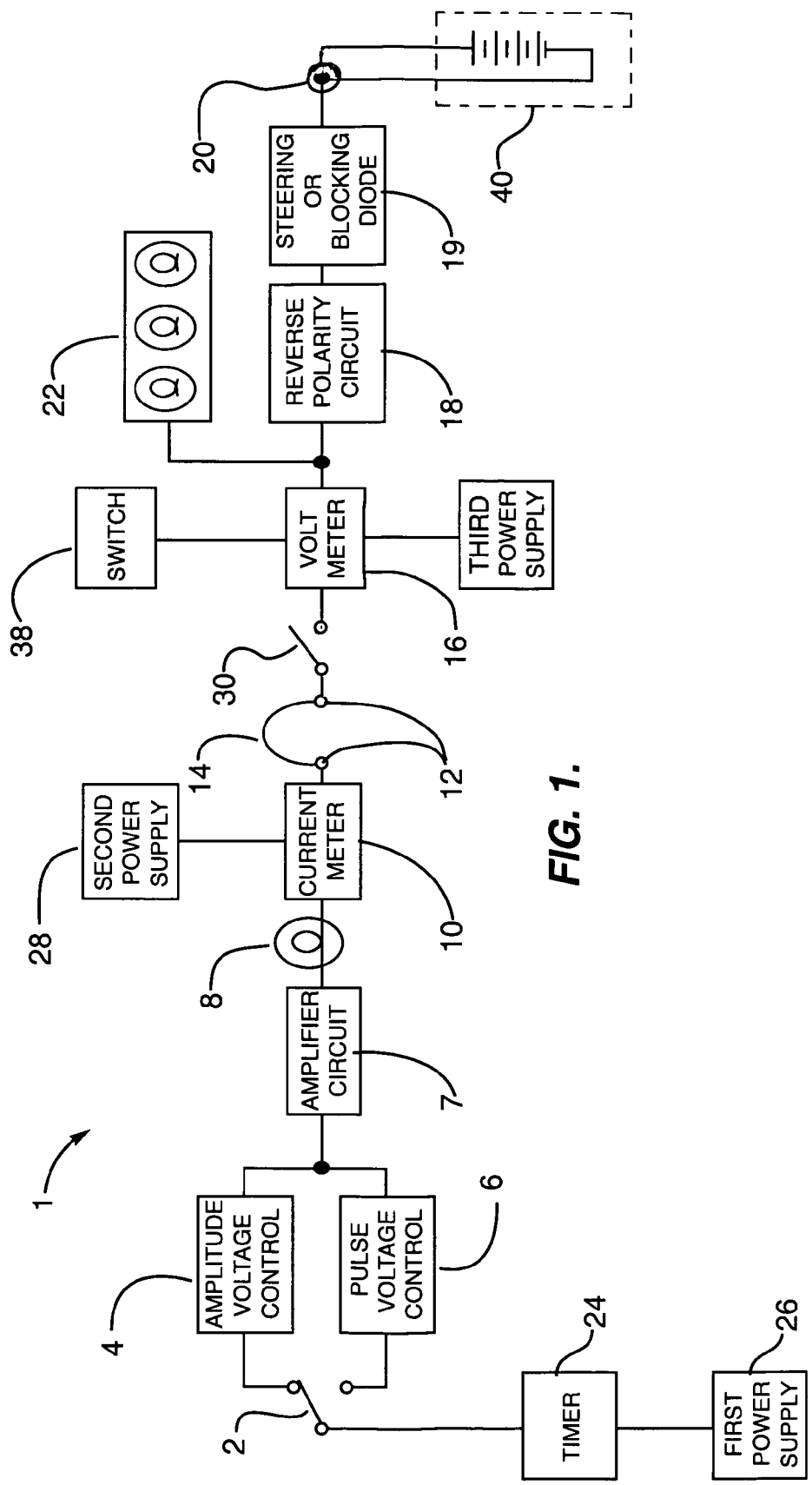
FIG. 1 is a block diagram of an embodiment of a battery charger.

As illustrated in FIG. 1, a block diagram shows an embodiment of a battery charger 1. The battery charger has a first power supply 26, a timer 24, a mode selector switch 2, an amplitude voltage control circuit 4, a pulse voltage control circuit 6, a current meter 10, a second power supply 28, and a battery connection 20. Additionally, a battery charger may have a status lamp 8, a charger output switch 30, a test port 12, a jumper 14, a voltmeter 16, a reverse polarity circuit 18, and an indicator circuit 22.

Figure 2:
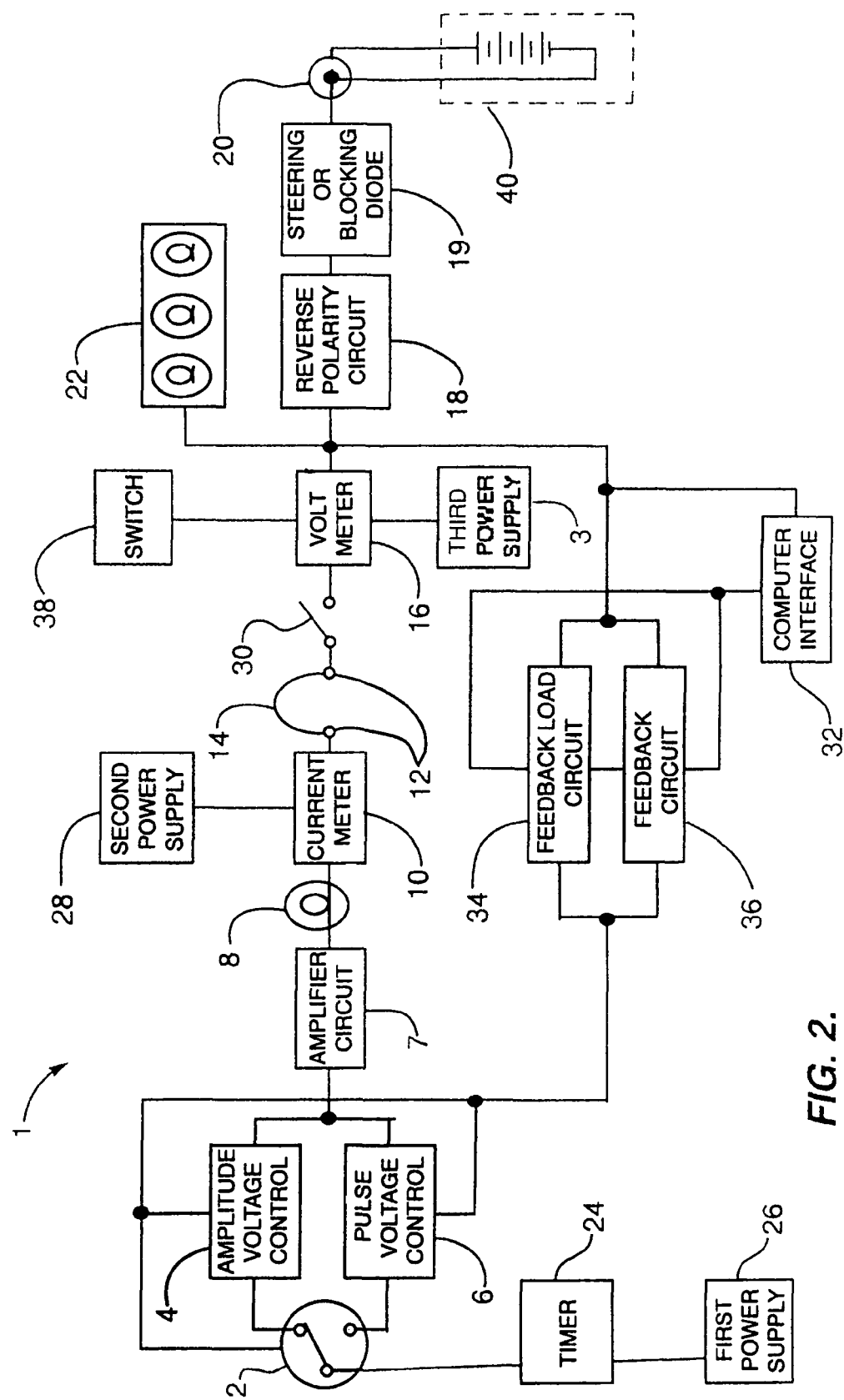
FIG. 2 is a block diagram of another embodiment of a battery charger.

FIG. 2 illustrates another embodiment of a battery charger, where a computer interface 32, a feedback load 34, and a detection and feedback circuit 36 may be added to the battery charger 1.

The first power supply 26 may be a standard regulated power supply as a means for providing a source of current for the battery charger 1. The power supply needs to be capable of supplying the current necessary to charge one or more types of batteries. As some types of batteries require high current or voltage, such as lead-acid batteries, the battery charger may not be able to charge all types of batteries depending on the capabilities of the power supply.

The power supply on the embodiment shown in FIG. 1 may be a power supply which can detect the incoming voltage and frequency, and supply a regulated DC voltage which is consistent regardless of the characteristics of the incoming AC power. This is an advantage as different countries have different power grids supplying different voltages and at different frequencies. As many international travelers have discovered, electronic devices with power supplies designed for one country may not work when connected in another country with a different power grid. By having a power supply which accepts a wide range of voltages and frequencies, the battery charger may be used in many different countries without a need to change the power supply.

The timer 24 may have power supplied from the first power supply 26. The timer 24 may also have power supplied from the AC voltage of a country's power grid. Some timers are designed to use the cycles of input AC voltage to operate the clock. For instance, in the United States of America the voltage supplied is at sixty hertz, or sixty cycles per second. A clock using the cycles as a measure will measure sixty cycles and then advance one second. The same clock will not keep accurate time in a country where the voltage supplied is at fifty cycles per second. The clock will still wait for sixty cycles to advance one second. For this reason the timer 24 may be supplied voltage from the first power supply 26.

The timer 24 shown in FIG. 1 may be used as a switch to switch on or off voltage to the battery charger 1. The timer 24 may have several different functions including but not limited to: a first function where the power is turned off and remains off when the timer completes the count; a second function where power is turned on and remains on when the timer completes the count; a third function where power is turned off after the timer completes a first count and then turns on again after the timer completes a second count; a fourth function where power is turned on after the timer completes a first count and turns off after the timer completes a second count; and a fifth function which is the same as the fourth function except that the cycle repeats. There are many possibilities for the use of a timer with multiple functions, and many functions which are not described but which are known to those skilled in the art of electronic timers.

The timer 24 may be used to shut off the charger after a battery has charged for the time set. In a regulated industry where batteries must be tested and certified, it is necessary to test batteries within a short time after receiving a full charge. It is desirable to have a charger which can complete the charging cycle at a specified time, when personnel and equipment are available. The timer may also be used so that batteries will be at the end of charging at a specified time by using the fourth function described above by first setting the time when the charger will turn on, and then setting the time when the charger will turn off, according to how long the batteries need to charge.

The mode selector switch 2 shown in FIG. 1 may be a switch operated by a user to switch the modes from the amplitude voltage control to the pulse voltage control modes. The mode selector switch 2 may also be a switch operated by the load circuit 34, or a detection and feedback circuit 36. The mode selector switch 2 may also be controlled by a computer interface 32. See FIG. 2.

With the mode selector switch 2 connected to the amplitude voltage control 4 the battery charger 1 can supply a battery with continuous current. With the mode selector switch 2 connected to the pulse voltage control 6 the battery charger 1 can supply a battery with pulses of current. Both the amplitude voltage control 4 and the pulse voltage control 6 may be connected to an amplifier circuit 7 which may be set by a user, and which controls the voltage amplitude of the output voltage or the charging current. The amplifier circuit 7 may include an adjustable resistor which sets a bias voltage, or gain, for an amplifier. An amplifier in the amplifier circuit 7 may be used to supply continuous voltage when connected to the amplitude voltage control circuit 4, or may be used to provide a pulse when connected to the pulse voltage control circuit 6.

Figure 4:
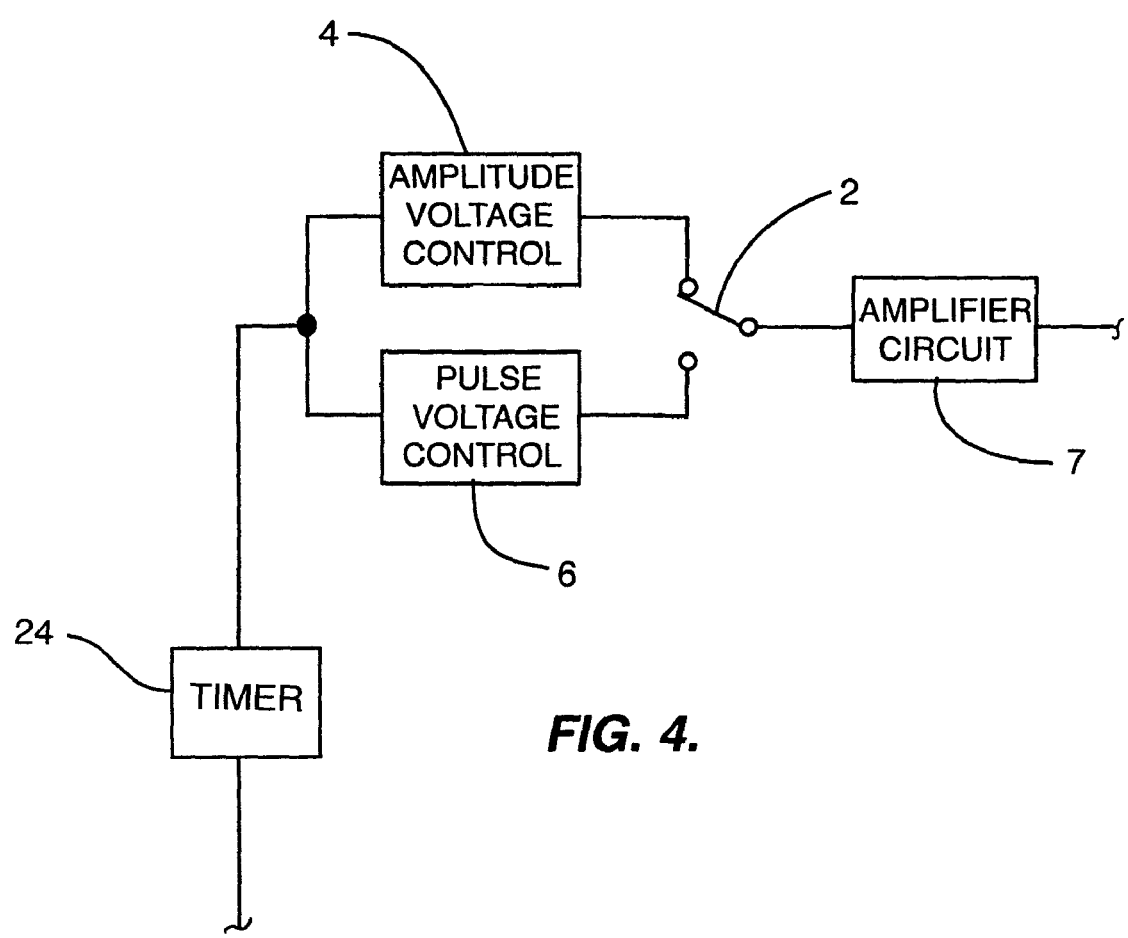
FIG. 4 is a block diagram of an embodiment of part of a battery charger showing an alternate location for a mode selector switch for the apparatus of FIGS. 1, 2, and 3.

The mode selector switch 2 may be connected between the timer 24 and the amplitude voltage control circuit 4 and pulse voltage control circuit 6 as shown in FIGS. 1 and 2. The mode selector switch 2 may also be connected between the amplifier circuit 7 and the amplitude voltage control 4 and the pulse voltage control circuit 6 as shown in FIG. 4.

The pulse voltage control circuit 6 may include a wave form generator circuit which will control the switching of the amplifier circuit 7 on and off. The wave form generator circuit may include adjustments for the shape of the wave form including the slope of the leading edge, the slope of the trailing edge, the duty cycle, and the frequency. The adjustments for the wave form generator may be potentiometers, resistors, capacitors, and other components. The adjustments for the wave form generator may also be controlled by the computer interface 32, the feedback load circuit 34, or the detection and feedback circuit 36.

A status lamp 8 may be electrically coupled to the output of the amplifier circuit 7 to show when the current from the amplifier circuit is flowing. In this manner the status lamp 8 would show a steady light when the mode selector switch 2 is set to amplitude voltage control 4 and the amplifier circuit 7 delivers a continuous charging current at a constant voltage.

When the mode selector switch 2 is set to pulse voltage control 6, the status lamp 8 will turn on and off with the cycling of the pulses. The status lamp 8 may be a light bulb, a light emitting diode, or other appropriate device.

As it may be desirable to have the peak value of the amplifier circuit 7 be the same in the pulse voltage control mode as in the amplitude voltage control mode, a calibration may be performed. An example calibration may be performed in the following manner. The battery charger 1 is first placed in pulse voltage control mode and the output of the amplifier is monitored to measure the peak value of the amplifier output. The output of the amplifier may be monitored by reading the peak value from three or more cycles to determine an average peak value.

The battery charger 1 is then placed in amplitude voltage control mode. The amplitude voltage control 4 may include an adjustable resistor to bias the signal sent to the amplifier circuit 7. The output of the amplifier circuit is measured with the battery charge in amplitude voltage control mode and the adjustable resistor is adjusted until the value measured in amplitude voltage control mode is the same as the value measured in pulse voltage control mode. Using this example method of calibration, the peak output of the amplifier circuit may be the same for pulse voltage control mode and amplitude voltage control mode.

A current meter 10 may be included as part of the battery charger 1, and electrically coupled to the output of the amplifier circuit 7 to show the amperage of the output from the amplifier. The current meter 10 may have power supplied by an independent regulated power supply, such as power supply 28, which provides isolation from ground and provides an isolated input. The current meter 10 may measure and display the current flowing to a battery 40. With the mode selector switch 2 set to pulse voltage control 6 the value on the current meter 10 may change from zero to the peak current.

In an example method for a user to set the initial value of the current for starting a battery charge, the battery charger 1 may be first in amplitude voltage control mode. The amplifier circuit 7 may be adjusted to set the gain for the amplifier to the desired starting output as read on the current meter 10. The mode selector switch 2 may then be changed to the pulse voltage control mode and the amplifier will deliver a peak voltage that is substantially the same as the amplitude of voltage as was set in the amplitude voltage control mode.

The amplifier may be biased by a voltage set by the amplifier circuit 7 with an output voltage based on the amplifier circuit 7. The amperage as measured on the current meter 10 is based on the output voltage from the amplifier, and the resistance in the battery. As the resistance in the battery changes from the battery charging, based on Ohm's law, the current seen on the current meter 10 changes. If the resistance in the battery 40 increases the current meter will show a decrease in amperage. This is different from conventional battery chargers which set a constant current, and as the resistance in the battery changes the battery charger compensates by increasing the voltage from an amplifier.

Some conventional battery chargers "respond" to the battery charging by changing cycles based on the voltage in the battery, for instance when the battery voltage reaches full value the amplifier is given a different target for amperage. The disclosed battery charger, however, may "respond" to change the state of the battery simply based on Ohm's law. As the battery voltage increases there is more resistance to the voltage supplied, and the current measured decreases.

The method of charging a battery which is disclosed decreases the chance that the battery charger will supply the battery with more current than the battery can use in the form of chemical changes, and therefore the chance of overheating a battery. Charging a battery by using pulses further decreases the chance that a battery will be overheated by the electricity applied to charge the battery as the chemical reactions in the battery are able to compensate between the pulses.

A test port 12 may be included with two sides. The test port may be used to calibrate the battery charger. It may be included in the circuit so that a calibration meter may be inserted in series to measure current. When the battery charger 1 is in normal operation a jumper 14 may be inserted into the test port, and which jumper may be removed later for calibration.

A voltmeter 16 may be included in an embodiment of the disclosed battery charger. The voltmeter 16 may have an independent power supply 3. The voltmeter 16 may include a rotary switch 38 to measure different voltages, including the voltage from the power supply 3 as a reference voltage. A charger output switch 30 may also be included as an on-off switch for connecting the charging current to the battery to be charged. The charger output switch may be positioned to disconnect the battery from the amplifier, so that a battery 40 may be safely removed without turning off the main power to the charger. The charger output switch 30 may be positioned and used so that the battery may be disconnected from the amplifier, but still connected to the voltmeter 16, the computer interface 32, the feedback circuit 34, and the detection and feedback circuit 36. In this manner the battery charger 1 may be used for testing purposes. It will be noted that output from the amplifier circuit 7 is the charge circuit output.

A polarity circuit 18 may be included which indicates an incorrectly attached battery 40, or a battery which has malfunctioned and has a reverse polarity. The polarity circuit may include an indicator such as an LED or a speaker to indicate that the battery has incorrect polarity. The polarity circuit 18 may be connected to terminals of the battery connection 20. A steering diode or blocking diode 19 may also be included in the battery charger 1 and may be positioned to prevent current flowing from a battery in a direction opposite of the charging current. The steering diode or blocking diode 19 may be connected to the battery connection 20.

With the battery connected correctly the indicator circuit 22 may be used to determine the status of the battery. The indicator circuit 22 may have multiple LEDs to indicate the voltage range of the battery 40, and may be used during charging of the battery to indicate charging status of the battery. The indicator circuit 22 may also be used with the charging current switched off, or even with the power supply 26 switched off.

In an example embodiment a yellow LED may indicate a voltage range below the desired battery voltage range, a green LED may indicate voltage within the desired voltage range, and a red LED may indicate voltage above the desired voltage range. The indicator circuit 22 may contain more or less LEDs to indicate the voltage range and may be used to make a quick determination of the battery status. The indicators in this circuit may be a lamp, an LED, or other visual or audio indicator.

An embodiment of the battery charger as shown in FIG. 2 may include feedback controls. The feedback controls may include a computer interface 32, a feedback load circuit 34, and a detection and feedback circuit 36. The detection and feedback circuit may measure the battery voltage, battery temperature from a temperature sensor which is mounted on the battery being charged, and battery charge time for the amount of time a battery has been charged, including measuring each pulse when pulse voltage control mode is used.

In some applications batteries need to be tested by applying a load across the battery and testing the ability of the battery to maintain voltage and current across the load for a period of time. This testing is typically performed using equipment separate from the battery charging equipment. The battery charger 1 may be used to test batteries and gather necessary information to determine if a battery passes certification tests. The computer interface 32 may be used to record data on a computer. The data may include information from the detection and feedback circuit 36 and from the feedback load circuit 34.

The disclosed battery charger 1 may include a feedback load circuit 34 with or without a detection and feedback circuit 36 and with or without a computer interface 32. The feedback load circuit 34 may provide a load, which may be changed based on the characteristics of the battery 40 and the test required for that battery. The feedback load circuit 34 may also be used to determine when a battery is at full capacity and provide feedback to stop the charging.

The feedback load circuit 34 may also be used to automatically test a battery 40 when a charging cycle is complete, and gather the data to determine if the battery passes certification. The feedback load circuit 34 may be used to determine the load capability of a battery being charged. After the test, the battery may be recharged by the battery charger 1. The feedback load circuit 34 may also be used to determine when a battery 40 is at fill capacity, and provide feedback to switch modes through the mode selector switch 2 for a trickle charge to maintain the battery 40 at full capacity.

The disclosed battery charger 1 may include a detection and feedback circuit 36 with or without a feedback load circuit 34 and with or without a computer interface 32 as shown in FIG. 2. The detection and feedback circuit 36 may detect conditions relevant to when a battery is at full capacity and provide feedback to the battery charger 1 to stop charging. Conditions relevant to when the battery 40 is at full capacity may include but are not limited to: a rise in the temperature of the battery by a certain amount, the period of time a battery is charged, current flowing through the battery, change in current flowing through the battery, voltage of the battery, change in voltage of the battery, and total energy delivered to the battery.

Figure 3:
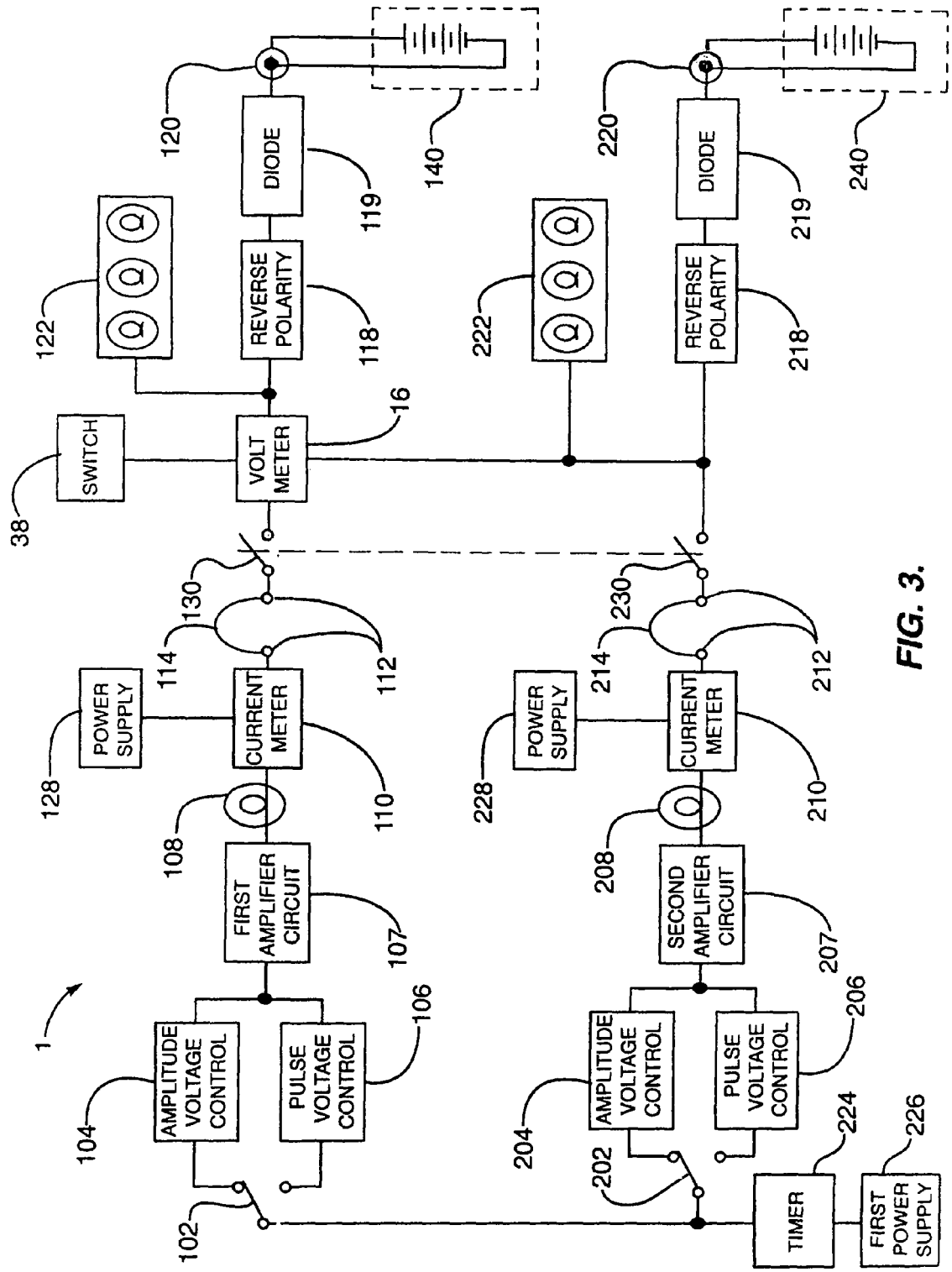
FIG. 3 is a block diagram of an embodiment of a battery charger with multiple channels.

FIG. 3 is a block diagram of an embodiment of a battery charger with multiple channels. FIG. 3 shows two channels which may be charged at the same time with independent controls so that a battery 140 connected to channel 1 may be charged with different voltage and charging current settings from a battery 240 connected to channel 2. Although only two channels are shown in FIG. 3, the example embodiment illustrates how multiple channels of two or more may be connected in a battery charger. FIG. 3 does not show the detection and feedback circuit 36, feedback load circuit 34, and computer interface 32 as shown in FIG. 2, but the battery charger 1 may be provided with multiple channels where each channel is connected to a separate detection and feedback circuit 36 with or without a feedback load circuit 34 and with or without a computer interface 32.

FIG. 3 shows a first channel of a battery charger 1 which may include a first channel mode selector switch 102, a first channel amplitude voltage control 104, a first channel pulse voltage control 106, a first channel amplifier circuit 107, a first channel status lamp 108, a first channel current meter 110, a first channel test port 112, a first channel jumper 114, a first channel polarity circuit 118, a first channel steering diode or blocking diode 119, a first channel battery connection 120, a first channel indicator circuit 122, and a first channel current meter power supply 128. The first channel may be connected to a first channel battery 140.

The operation of the first channel may be the same as the operations of the battery charger 1 described above and shown in FIGS. 1 and 2. The voltmeter 16 may be connected to more than one channel using a switch to read one channel at a time. The voltmeter 16 may also be connected to the power supply 26 to read a reference voltage. The voltmeter 16 may be included in each channel with separate voltmeters for each channel. The charger output switch 30 may be a single throw switch with multiple poles so that one switch may be used to turn off the charger output for multiple channels. The charger output switch 30 may be included as a separate switch in each channel, if desired.

A second channel may be included similar to the first channel and may include a second channel mode selector switch 202, a second channel amplitude voltage control 204, a second channel pulse voltage control 206, a second channel amplifier circuit 207, a second channel status lamp 208, a second channel current meter 210, a second channel test port 212, a second channel jumper 214, a second channel polarity circuit 218, a second channel steering diode or blocking diode 219, a second channel battery connection 220, a second channel indicator circuit 222, and a second channel current meter power supply 228. The second channel may be connected to a second channel battery 240. The first channel current meter power supply 128 and the second channel current meter power supply 228 may be independent power supplies isolated from ground and from other power supplies to provide an isolated input for each current meter.

In the example embodiment of FIG. 3 with multiple channels, the charging current provided to each battery may be adjusted independently from the other channels using the first channel amplifier circuit 107 and the second channel amplifier circuit 207. Additional channels may be added with an amplifier circuit for each channel.

Figure 5:
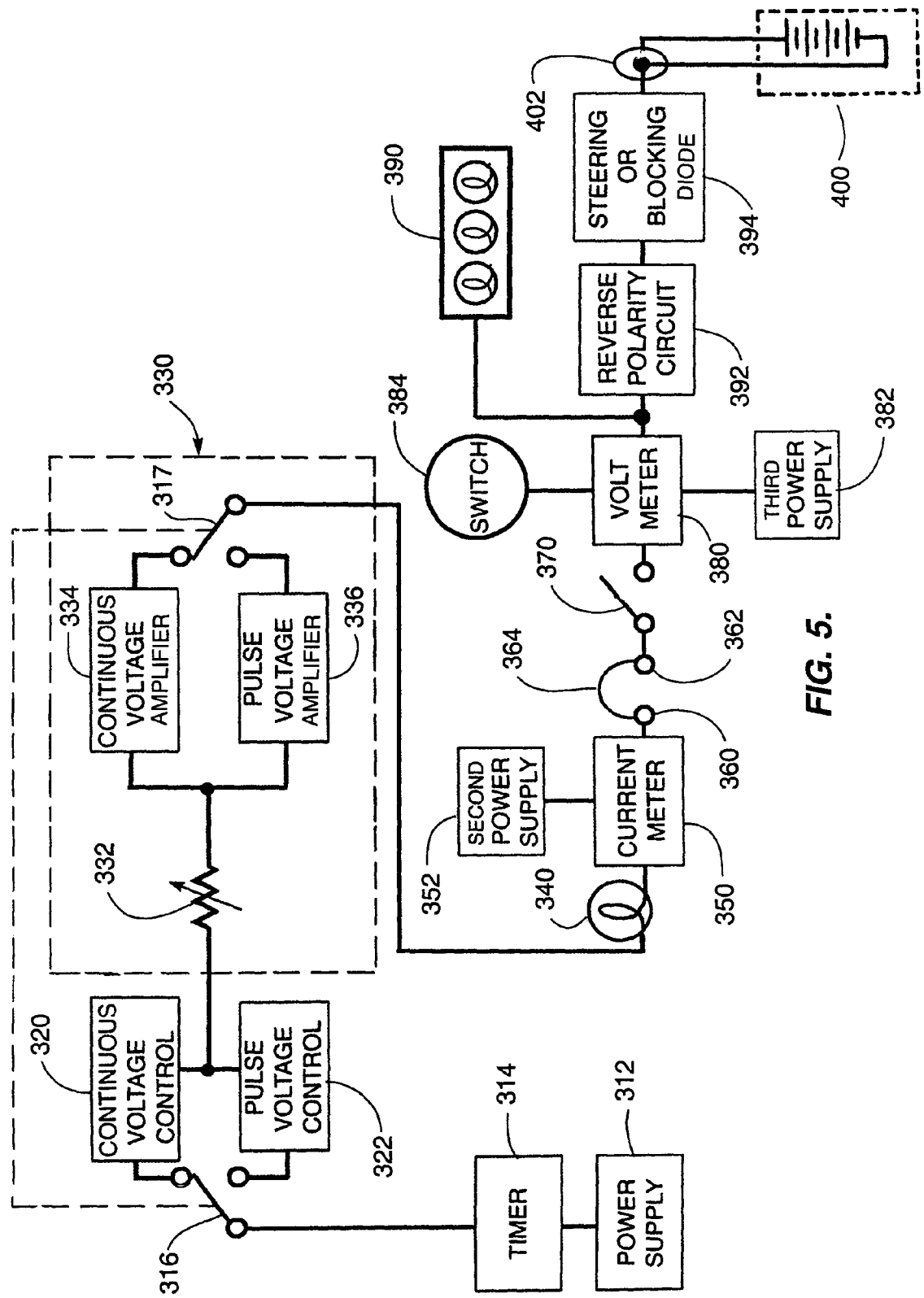
FIG. 5 is a schematic block diagram of another alternate embodiment of the battery charger of the present invention.

FIG. 5 comprises a schematic representation of a battery charger 310 illustrating the use of a potentiometer setting the bias of a continuous voltage amplifier and a pulse voltage amplifier. The battery charge apparatus 310 includes the basic elements of the battery charger 1 of FIGS. 1, 2, and 3.

A first power supply 312 is connected to a timer 314. The functions of the timer 314 are the same as discussed above for the timer 24. The output from the timer 314 then flows to a mode selector switch 316. The selector switch 316 selects either a continuous voltage control circuit 320 or a pulse voltage control circuit 322.

The output from the selected voltage control circuit 320 or 322 extends to a potentiometer 332. The potentiometer 332 is used to set the bias for either a continuous voltage amplifier 334 or a pulse voltage amplifier 336.

A second mode selector switch 317 is ganged in parallel with the mode selector switch 316, and the selected output from the two mode selector switches determines which output from the amplifiers 334 or 336 provides the charging current for charging a battery. While two mode selector switches 316 and 317 are shown, they may be considered as a single switch for selecting either the continuous voltage mode or the pulse voltage mode of charging a battery. A single selection of the desired mode actuates both selector switches.

A dotted line block 330 is shown about the potentiometer 332 and the amplifiers 334 and 336 and the mode selector switch 317. The block 330 is shown in FIG. 7, discussed below.

The charging output from the selected amplifier 334 or 336 then flows to a status lamp 340 and then to a current meter 350. The current meter 350 has its own isolated power supply, a second power supply 352. Again, the functions of the status lamp 340 and the current meter are substantially the same as discussed above for the corresponding elements in the chargers of FIGS. 1, 2, and 3.

A pair of test ports 360 and 362 are next in the circuit. A jumper 364 bypasses the test ports 360, 362 when no tester is connected to the test ports.

A charger output switch 370, essentially an on/off switch, is in series with the charging output.

The charging output then flows through a voltmeter 380. Connected to the voltmeter 380 is a rotary switch 384. Power for the voltmeter is provided by a third power supply 382. As noted above, the power supplies 352 and 382 are isolated power supplies.

An indicator circuit 390 visually indicates the charging status of the battery being charged, as discussed above. The indicator circuit 390 is in parallel with the charging current.

A reverse polarity circuit 392 and a steering or blocking diode 394 prevent reverse polarity current from flowing to a battery 400 being charged. The battery 400 is connected to the charging current through a battery connection 402.

Note also, as stated above, that the battery 400 is an integral part of the charging apparatus. As the battery 400 charges, its resistance increases, and with substantially constant charging voltage, either continuous or pulsed, as selected by the mode selector switches, the charging current decreases.

It will be noted that except for the circuitry in the block 330, the elements of the charger 310 are substantially identical to the elements of the charger 1 discussed above, with new reference numerals provided for the embodiment of the charger 310.

Figure 6:
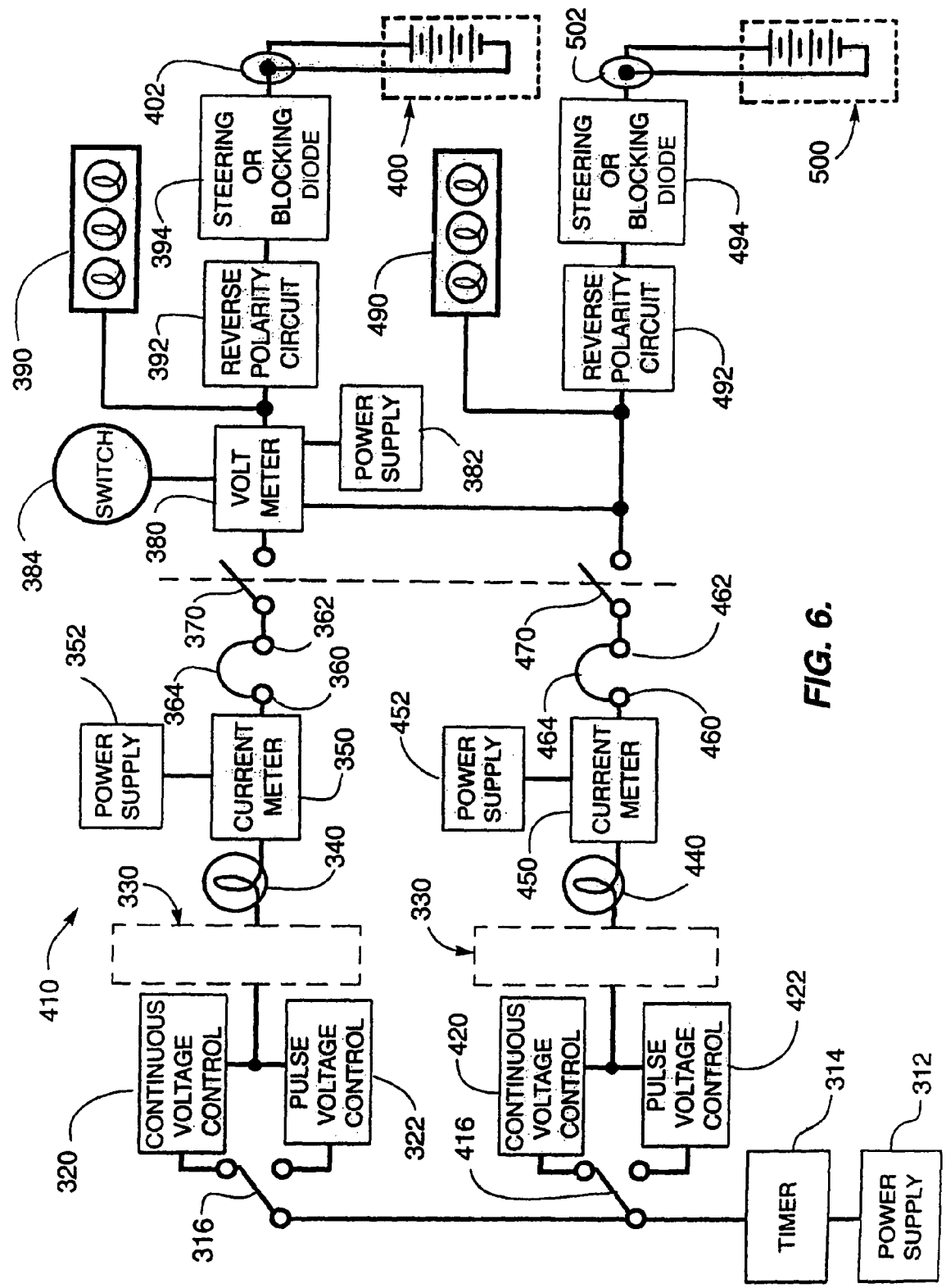
FIG. 6 is a schematic block diagram of still another alternate embodiment of the battery charger of the present invention.

FIG. 6 is a schematic diagram of a charger 410. The charger 410 is comparable to the charger embodiment of FIG. 3, where multiple batteries may be independently charged. The same reference numerals are used to identify the various circuit elements as used in the charger 310, but with the block 330 used in place of the elements shown within the block 330 in FIG. 5. Note that a single power supply 312 provides the charging current for the multiple batteries being charged.

Multiple batteries may be charged with the multi channel apparatus 410, but with individual charging parameters set for matching the characteristics for each battery as appropriate or as desired.

Two charging channels are shown schematically in FIG. 7, with common elements as discussed above for the charger apparatus 310.

The battery apparatus 410 includes a common power supply 312 connected to a timer 314. The power supply 312 provides the charging current for batteries 400 and 500. The timer 314 provides the desired charging timing for the charger apparatus 410, substantially identically as set forth above for the above described charger apparatus.

Mode selector switches 316 and 416 are used to independently select a desired charging more for each battery 400 and 500. The mode selector switches 316 and 416 are ganged with the mode selector switches in the blocks 330, as discussed above for the charger 310.

The circuit elements in the blocks 330 then send the selected continuous or pulsed voltage to the selected amplifier for providing the charging current, continuous or pulsed, for charging the batteries 400 and 500 independently of each other.

Status lamps 340 and 440 are next after the selected amplifiers in the charging circuits, followed by current meters 350 and 450. Each current meter has its own isolated power supply, power supplies 352 and 452, respectively, for the meters 350 and 450.

Test probe connectors 360, 362 and 460, 462, with their respective jumpers 364 and 464, respectively, are next. On/off switches 370 and 470 are next in the circuits. The switches 370 and 470 are shown ganged for common actuation.

A voltmeter 380, with its rotary switch 384, has its own isolated power supply 382. The rotary switch 384 allows the meter 380 to indicate the charging voltage in a selected charging circuit.

Each charging circuit has its own charging status indicator circuit 390 and 490, respectively for the charging circuits for the batteries 400 and 500. The indicator circuits 390 and 490 are in parallel with the respective charging currents.

Each charging circuit also has its own reverse polarity circuit 392 and 492, and steering or blocking diodes 394 and 494, respectively, for the batteries 400 and 500.

The batteries 400 and 500 are connected to their respective charging currents through battery connections 402 and 502, respectively.

The various battery charger apparatus or embodiments illustrated in FIGS. 5 and 6 and discussed herein include essentially the same circuit elements performing their same circuit functions as discussed above for the charger apparatus of FIGS. 1, 2, and 3, with the exception of the circuit elements in the block 330. The block 330 is shown in FIG. 6 in both charging channels. It will be understood that there may be as many channels included in a charger, such as the charger apparatus 410, as desired or as practical. The charging parameters of each channel may be independently set, as discussed.

While the principles of the above described apparatus have been made clear in illustrative embodiments, without departing from those principles there may occur to those skilled in the art modifications of structure, arrangement, proportions, the elements, materials, and components used in the practice of the apparatus, and otherwise, which are particularly adapted to specific environments and operative requirements. The appended claims are intended to cover and embrace any and all such modifications within the limits only of the true spirit and scope of the present disclosure.

What we claim is:

1. Battery charger apparatus comprising in combination:
   a battery to be charged;
   a first power supply for providing a first source of charging current for charging the battery;
   a timer for setting a predetermined time for charging the battery by the charging current;
   a continuous voltage control circuit for providing a continuous voltage and defining a first mode of charging;
   a pulse voltage control circuit for providing pulses of voltage and defining a second mode of charging;
   a mode selector switch for selecting a mode of charging between the continuous voltage and the pulse voltage for charging the battery;
   a continuous voltage amplifier for amplifying the continuous voltage;
   a pulse voltage amplifier for amplifying the pulses of voltage;
   a potentiometer for setting the amplitude of voltage desired for charging the battery and accordingly the initial charging current; and
   means for connecting the initial charging current to the battery.

2. The battery charger apparatus of claim 1 which further includes a current meter for displaying the charging current.

3. The battery charger apparatus of claim 2 which further includes a second power supply for the current meter.

4. The battery charger apparatus of claim 1 which further includes an on-off switch for connecting and disconnecting the charging current to the battery.

5. The battery charger of claim 1 in which the first power supply is a regulated power supply.

6. The battery charger of claim 1 which further includes means for indicating the charging status of the battery.

7. The battery charger apparatus of claim 6 in which the means for indicating the charging status of the battery is in parallel with the charging current.

8. The battery charger apparatus of claim 1 in which the battery being charged is an aircraft egress lighting battery.

9. The battery charger apparatus of claim 1 in which the battery being charged is a NiCd battery.

10. The battery charger apparatus of claim 1 in which the continuous voltage amplifier provides a voltage of substantially constant amplitude for the predetermined time.

11. The battery charger apparatus of claim 1 in which the pulse voltage amplifier provides a pulsed voltage of substantially constant amplitude for the predetermined time.

12. Battery charger apparatus comprising in combination:
    a plurality of batteries to be charged;
    a first power supply for providing charging current for charging the plurality of batteries;
    a plurality of continuous voltage control circuits for providing a continuous voltage for each battery of the plurality of batteries and defining a first mode of charging for each battery of the plurality of batteries;
    a plurality of pulse voltage control circuits for providing a pulses of voltage for each battery of the plurality of batteries and defining a second mode of charging for each battery of the plurality of batteries;
    a plurality of mode selector switches for selecting a mode of charging for each battery of the plurality of batteries from the first mode of charging and the second mode of charging;
    a plurality of continuous voltage amplifiers for amplifying the continuous voltage from each continuous voltage control circuit of the plurality of voltage control circuits for the first mode of charging;
    a plurality of pulse voltage amplifiers for amplifying the pulse voltage from each pulse voltage control circuit, and a continuous voltage amplifier and a pulse voltage amplifier are paired for charging each battery of the plurality of batteries for the second mode of charging;
    a plurality of potentiometers for setting a desired amplitude of voltage for each pair of amplifiers of the plurality of paired continuous and pulse voltage amplifiers for setting the desired initial charging current for each battery of the plurality of batteries; and
    means for connecting the initial charging current to each battery of the plurality of batteries.

13. The battery charger apparatus of claim 12 which further includes a current meter for displaying the charging current for each battery of the plurality of batteries.

14. The battery charger apparatus of claim 12 which further includes a voltmeter for sensing the voltages of the amplifiers and a rotary switch for selectively connecting the voltmeter to each of the amplifiers of the selected modes of charging for the plurality of batteries.

* * * * *